US010612759B2

(12) United States Patent
Wan et al.

(10) Patent No.: US 10,612,759 B2
(45) Date of Patent: Apr. 7, 2020

(54) MONITOR, LIGHT CONTROL SYSTEM, AND LIGHT FIXTURE CONTROL METHOD

(71) Applicant: Huawei Technologies Co., Ltd., Shenzhen (CN)

(72) Inventors: Junqiao Wan, Istanbul (TR); Jinbo Huang, Dongguan (CN); Wang Pan, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/284,683

(22) Filed: Feb. 25, 2019

(65) Prior Publication Data

US 2019/0264901 A1   Aug. 29, 2019

(30) Foreign Application Priority Data

Feb. 24, 2018   (CN) .......................... 2018 1 0157634

(51) Int. Cl.
*F21V 23/02*   (2006.01)
*F21V 23/00*   (2015.01)
(Continued)

(52) U.S. Cl.
CPC .............. *F21V 23/023* (2013.01); *B64F 1/18* (2013.01); *F21S 2/005* (2013.01); *F21V 23/002* (2013.01);
(Continued)

(58) Field of Classification Search
None
See application file for complete search history.

(56) References Cited

U.S. PATENT DOCUMENTS 3,284,667 A * 11/1966 Harris ................ H05B 41/3924
                                                              315/195
3,323,014 A *  5/1967 West .................. H05B 41/3924
                                                              315/194
(Continued)

FOREIGN PATENT DOCUMENTS

JP        H10308287 A      11/1998

OTHER PUBLICATIONS

Machine Translation and Abstract of Japanese Publication No. JPH10308287, Nov. 17, 1998, 11 pages.
(Continued)

*Primary Examiner* — Alexander H Taningco
*Assistant Examiner* — Srinivas Sathiraju
(74) *Attorney, Agent, or Firm* — Conley Rose, P.C.

(57) ABSTRACT

A monitor, including a first wiring terminal group, a second wiring terminal group, and a grounding terminal, where the first wiring terminal group includes a first wiring terminal and a second wiring terminal, the first wiring terminal is configured to couple to a conducting wire of a cable, and the second wiring terminal is configured to couple to one end of a primary coil of an isolation transformer, the second wiring terminal group includes a third wiring terminal and a fourth wiring terminal, the third wiring terminal is configured to couple to the conducting wire of the cable, and the fourth wiring terminal is configured to couple to the other end of the primary coil of the isolation transformer, and the grounding terminal is configured to couple to a grounding medium of the cable.

20 Claims, 13 Drawing Sheets

(51) Int. Cl.
    *H01F 27/28*     (2006.01)
    *H01F 27/29*     (2006.01)
    *H04B 3/54*     (2006.01)
    *F21S 2/00*     (2016.01)
    *B64F 1/18*     (2006.01)
    *H05B 45/00*     (2020.01)

(52) U.S. Cl.
    CPC ........ *F21V 23/026* (2013.01); *H01F 27/2823* (2013.01); *H01F 27/29* (2013.01); *H04B 3/54* (2013.01); *H05B 45/00* (2020.01)

(56) References Cited

U.S. PATENT DOCUMENTS

| | | | |
|---|---|---|---|
| 5,331,619 A * | 7/1994 | Barnum | G05B 19/0421 137/624.11 |
| 5,471,119 A * | 11/1995 | Ranganath | H05B 37/02 315/294 |
| 2016/0286634 A1* | 9/2016 | Won | H05B 37/03 |
| 2017/0105265 A1* | 4/2017 | Sadwick | A61N 5/0618 |
| 2017/0311396 A1* | 10/2017 | Sadwick | F21V 25/00 |
| 2017/0311427 A1* | 10/2017 | Chawda | H05B 39/00 |
| 2019/0182415 A1* | 6/2019 | Sivan | H04N 5/23203 |
| 2019/0264901 A1* | 8/2019 | Wan | B64F 1/18 |

OTHER PUBLICATIONS

Foreign Communication From a Counterpart Application, European Application No. 19158745.0, Extended European Search Report dated Mar. 22, 2019, 7 pages.

\* cited by examiner

MONITOR, LIGHT CONTROL SYSTEM, AND LIGHT FIXTURE CONTROL METHOD

CROSS-REFERENCE TO RELATED APPLICATION

This application claims priority to Chinese Patent Application No. 201810157634.6 filed on Feb. 24, 2018, which is hereby incorporated by reference in its entirety.

TECHNICAL FIELD

This application relates to the field of communications technologies, and in particular, to a monitor, a light control system, and a light fixture control method.

BACKGROUND

Airport visual aid facilities are facilities disposed at an airport to provide visual guidance signals for pilots to operate takeoff, landing, and taxiing of an aircraft. Common facilities include aviation lights. Usually, there is a plurality of aviation lights at the airport. Each aviation light requires a monitor to control on/off of the light. Guidance and risk warning can be provided for a pilot by controlling on/off of the light using the monitor.

A visual aviation light control system usually includes a power supply, a constant current regulator configured to regulate a loop current, a cable, a plurality of aviation lights, a plurality of isolation transformers, a monitor (referred to as a slave monitor) corresponding to each aviation light, and a master monitor configured to send a communication signal to the slave monitor.

To implement control over the aviation lights, the power supply, the constant current regulator, and the plurality of isolation transformers are connected in series using the cable. The master monitor is connected to the constant current regulator in parallel, and each aviation light and a corresponding slave monitor are connected to a secondary output terminal of one isolation transformer. The master monitor sends, by loading a power line carrier signal onto the cable, a communication signal to each slave monitor, to perform communication. The slave monitor obtains the power line carrier signal from the secondary output terminal of the isolation transformer in order to control on/off of the aviation light based on the power line carrier signal.

In an existing visual aviation light control system, a power line carrier between a master monitor and a slave monitor needs to pass through an isolation transformer, and is subject to attenuation. In addition, a path for transmitting a power line carrier signal between the master monitor and each slave monitor is an entire series loop and has a relatively long communication distance. As a result, the power line carrier signal between the master monitor and the slave monitor is seriously attenuated, and communication is unreliable.

SUMMARY

This application provides a monitor, a light control system, and a light fixture control method to resolve problems of severe attenuation of a power line carrier signal transmitted in a visual aviation light control system, and unreliable communication.

According to a first aspect, this application provides a monitor. The monitor includes a first wiring terminal group, a second wiring terminal group, a grounding terminal, a first power supply terminal, and a second power supply terminal, where the first wiring terminal group includes a first wiring terminal and a second wiring terminal, the first wiring terminal is configured to connect to a conducting wire of a cable, and the second wiring terminal is configured to connect to a first primary wiring terminal of an isolation transformer, the second wiring terminal group includes a third wiring terminal and a fourth wiring terminal, the third wiring terminal is configured to connect to the conducting wire of the cable, and the fourth wiring terminal is configured to connect to a second primary wiring terminal of the isolation transformer, the grounding terminal is configured to connect to a grounding medium of the cable, and the first power supply terminal is configured to connect to a secondary output terminal of the isolation transformer, and the second power supply terminal is configured to connect to a light fixture.

According to the foregoing method, the monitor may be directly connected to the conducting wire and the grounding medium of the cable using the first wiring terminal and the grounding terminal, and may receive a power line carrier signal directly using the cable. The power line carrier signal does not need to pass through the isolation transformer, thereby avoiding signal attenuation caused due to the power line carrier signal passing through the isolation transformer.

In a possible implementation, the monitor further includes a light control module, a controller, and a power line communication (PLC) module, where the PLC module includes a digital communication port and a carrier communication port, the digital communication port is connected to the controller, the carrier communication port is connected to the first wiring terminal and the grounding terminal, and the PLC module is configured to obtain, through demodulation, a control signal from a first power line carrier signal transmitted on the cable, and send the control signal to the controller, the controller is connected to the light control module, and is configured to control the light control module based on the control signal, the light control module is connected to the first power supply terminal and the second power supply terminal, and the light control module is configured to, under control of the controller, maintain a connection between the first power supply terminal and the second power supply terminal, or break a connection between the first power supply terminal and the second power supply terminal.

According to the foregoing method, a transmission path of the first power line carrier signal is a loop formed by the conducting wire and the grounding medium of the cable. This can better shorten the transmission path of the first power line carrier signal and further control signal attenuation. In addition, the first power line carrier signal does not need to pass through the secondary output terminal of the isolation transformer such that attenuation is small when the first power line carrier signal arrives at the PLC module of the monitor.

In a possible implementation, the light control module may indicate a light fixture status, the controller reads the light fixture status from the light control module, generates a report signal based on the light fixture status, and sends the report signal to the PLC module, and the PLC module modulates the report signal onto a second power line carrier signal, and transmits the modulated second power line carrier signal to the cable.

According to the foregoing method, the monitor can not only receive the first power line carrier signal on the cable, but also send the second power line carrier signal such that the monitor can perform bidirectional communication, making a communication manner more flexible.

In a possible implementation, the monitor may further include a first capacitor unit, where one end of the first capacitor unit is connected to the second wiring terminal, and the other end of the first capacitor unit is connected to the third wiring terminal and the fourth wiring terminal.

According to the foregoing method, the second wiring terminal and the fourth wiring terminal are connected to the two primary wiring terminals of the isolation transformer such that the first capacitor unit is connected to a primary coil of the isolation transformer in parallel, and the first capacitor unit can better transmit the high-frequency first power line carrier signal from one end of the primary coil of the isolation transformer to the other end. The first power line carrier signal does not need to pass through the primary coil of the isolation transformer, effectively reducing signal attenuation.

In a possible implementation, the first capacitor unit includes one first capacitor or a plurality of first capacitors.

According to the foregoing method, the first power line carrier signal is transmitted using the first capacitor. This can effectively control signal attenuation.

In a possible implementation, the first capacitor unit includes a first capacitor and a first fuse. For example, when the first capacitor unit includes one first capacitor and one first fuse, there are the following two connection manners.

Manner 1: One end of the first capacitor is connected to one end of the first fuse, the other end of the first capacitor is connected to the second wiring terminal, and the other end of the first fuse is connected to the third wiring terminal and the fourth wiring terminal.

Manner 2: One end of the first capacitor is connected to one end of the first fuse, the other end of the first capacitor is connected to the fourth wiring terminal, and the other end of the first fuse is connected to the third wiring terminal and the second wiring terminal.

When a plurality of first capacitors and a plurality of first fuses are included, another connection manner may be used, provided that when the first capacitor breaks down, the first fuse can break a connection to prevent the primary coil of the isolation transformer from being short-circuited.

According to the foregoing method, the first capacitor and the first fuse are connected in series such that after the first capacitor breaks down, the first fuse can break the connection to prevent the primary coil of the isolation transformer from being short-circuited, and the first power line carrier signal and an electrical signal can still be transmitted using the isolation transformer.

According to a second aspect, this application provides a light control system. The light control system includes a master monitor and a slave monitor, where the slave monitor is the monitor according to any one of the first aspect or the designs of the first aspect.

The master monitor is connected to a conducting wire and a grounding medium of a cable that are close to an output port of a constant current regulator. Further, the master monitor includes a primary carrier communication port, and the primary carrier communication port is connected to the conducting wire and the grounding medium of the cable that are close to the output port of the constant current regulator. The master monitor is configured to generate a first power line carrier signal, and send the first power line carrier signal to the slave monitor using the cable. The slave monitor is configured to directly receive the first power line carrier signal from the cable, and control a light fixture based on the first power line carrier signal.

According to the foregoing method, a transmission path of the first power line carrier signal transmitted between the master monitor and the slave monitor is a loop formed by the conducting wire and the grounding medium of the cable. This shortens the transmission path of the first power line carrier signal, and can better reduce attenuation of the power line carrier signal.

In a possible implementation, the light control system further includes a second capacitor unit, where two ends of the second capacitor unit are configured to connect to two ends of the conducting wire, of the cable, close to the output port of the constant current regulator. Further, one end of the second capacitor unit is connected to the conducting wire, of the cable, close to one terminal of the output port of the constant current regulator, and the other end of the second capacitor unit is connected to the conducting wire, of the cable, close to the other terminal of the output port of the constant current regulator.

According to the foregoing method, the second capacitor unit is connected to the constant current regulator in parallel and can transmit a power line carrier signal at one terminal of the output port of the constant current regulator to the cable at the other terminal. The slave monitor close to the two terminals of the constant current regulator can relatively quickly receive the power line carrier signal, and attenuation of the first power line carrier signal transmitted using the second capacitor unit is relatively small.

In a possible implementation, the second capacitor unit includes at least one second capacitor.

According to the foregoing method, the at least one second capacitor is connected to the constant current regulator in parallel, and the first power line carrier signal is transmitted using the second capacitor such that the slave monitor close to the output port of the constant current regulator can relatively quickly receive the first power line carrier signal, and a bit error rate of the transmitted first power line carrier signal may be ensured to be relatively low.

In a possible implementation, the second capacitor unit includes a second capacitor and a second fuse. For example, the second capacitor unit includes one second capacitor and one second fuse. One end of the second capacitor is connected to one end of the second fuse, and the other end of the second capacitor and the other end of the second fuse are connected to the conducting wire, of the cable, close to the two terminals of the output port of the constant current regulator. Alternatively, the second capacitor unit may include a plurality of second capacitors and a plurality of second fuses, provided that when the second capacitor breaks down, the second fuse can break a connection.

According to the foregoing method, the second capacitor and the second fuse are connected in series such that after the second capacitor breaks down, the second fuse can break the connection because of an excessively large current, to prevent a loop from being short-circuited and ensure normal operation of the light control system.

According to a third aspect, this application provides a light fixture control method. The method includes receiving, by a slave monitor, a first power line carrier signal from a master monitor using a cable, obtaining a control signal from the first power line carrier signal through demodulation, and controlling on/off of a light fixture based on the control signal, where the slave monitor is directly connected to the cable, and the light fixture is connected to the slave monitor.

According to the foregoing method, the slave monitor receives a power line carrier signal directly using the cable, and the power line carrier signal does not need to pass through an isolation transformer, thereby avoiding signal attenuation caused due to the power line carrier signal passing through the isolation transformer.

In a possible implementation, the slave monitor includes a first wiring terminal group, a second wiring terminal group, a grounding terminal, a first power supply terminal, and a second power supply terminal, the first wiring terminal group includes a first wiring terminal and a second wiring terminal, the first wiring terminal is connected to a conducting wire of the cable, and the second wiring terminal is connected to a first primary wiring terminal of an isolation transformer, the second wiring terminal group includes a third wiring terminal and a fourth wiring terminal, the third wiring terminal is connected to the conducting wire of the cable, and the fourth wiring terminal is connected to a second primary wiring terminal of the isolation transformer, the grounding terminal is connected to a grounding medium of the cable, the first power supply terminal is connected to a secondary output terminal of the isolation transformer, and the second power supply terminal is connected to the light fixture, and controlling, by the slave monitor, on/off of a light fixture based on the control signal includes setting up or breaking, based on the control signal, a connection between the secondary output terminal of the isolation transformer and the light fixture, to control on/off of the light fixture.

According to the foregoing method, the slave monitor receives the power line carrier signal directly using the cable, and controls the light fixture based on the control signal obtained from the power line carrier signal through demodulation. Because the power line carrier signal does not need to pass through the isolation transformer, attenuation of the power line carrier signal is relatively small, and a correct control signal can be obtained through demodulation, thereby ensuring that the slave monitor can relatively accurately turn on or turn off the light fixture based on the control signal.

DESCRIPTION OF EMBODIMENTS

Some terms used in this application are first described for ease of understanding by a person skilled in the art.

1. A fuse is a component that melts to cut off a loop when a current in the loop exceeds a threshold. The first fuse has a circuit protection function.

2. A light control module may include components such as a switch, a diode, and a triode. Any component that can implement connectivity of a path between a light fixture and a secondary output terminal of an isolation transformer is applicable to the embodiments of this application.

3. A controller is configured to control the light control module based on a first power line carrier signal in order to control power-on/power-off of a light fixture. The controller may be a central processing unit (CPU), a microprocessor (microcontroller unit (MCU)), an application-specific integrated circuit (ASIC), a field-programmable gate array (FPGA), or a complex programmable logic device (CPLD). Any component that can implement a function of controlling the light control module may serve as the controller.

4. "A plurality of" means two or more than two.

To make the objectives, technical solutions, and advantages of this application clearer, the following further describes this application in detail with reference to the accompanying drawings.

At present, a visual aviation light control system includes a power supply, a constant current regulator configured to regulate a loop current, a cable, a master monitor, a plurality of aviation lights, a plurality of isolation transformers, a plurality of single-light monitors (also referred to as slave monitors). Each aviation light corresponds to one slave monitor and one isolation transformer. The master monitor is configured to communicate with the slave monitor, and the slave monitor is configured to control on/off of the aviation light.

The constant current regulator is an apparatus configured to control a magnitude of a current in a loop. When a quantity of light fixtures that need to be controlled changes, the constant current regulator may control the magnitude of the current in the loop such that luminance of the light fixtures can remain consistent before and after the quantity of light fixtures changes.

Figure 1:
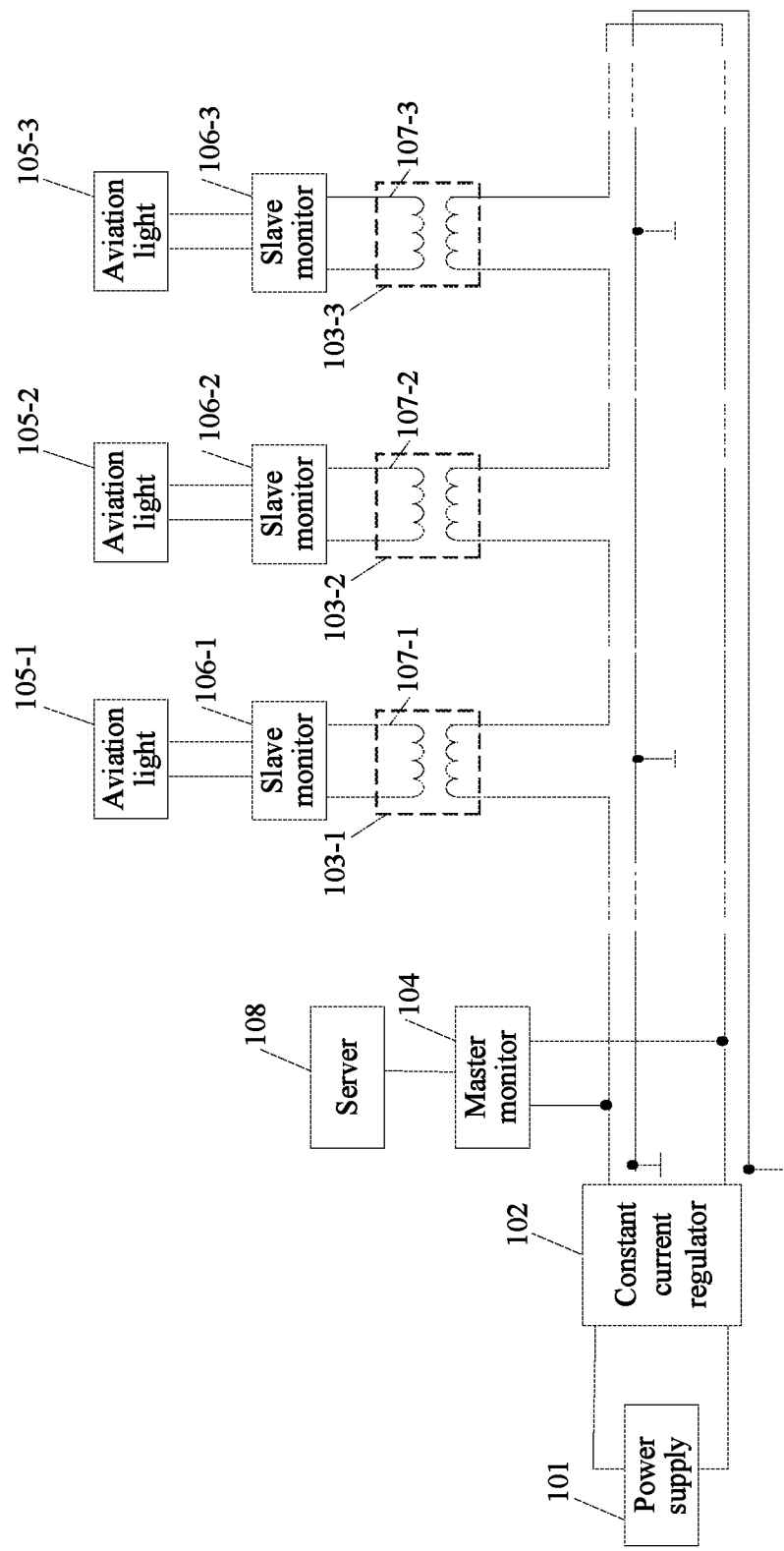
FIG. 1 is a schematic architectural diagram of a visual aviation light control system.

As shown in FIG. 1, a power supply 101 is connected to a constant current regulator 102, the constant current regulator 102 is connected to a plurality of isolation transformers (103-1, 103-2, 103-3, . . . ) in series using a cable, and a master monitor 104 is connected to an output port of the constant current regulator 102. Each aviation light corresponds to one slave monitor and one isolation transformer. For example, an aviation light 105-1 corresponds to a slave monitor 106-1 and an isolation transformer 103-1. Further, the aviation light 105-1 is connected to the slave monitor 106-1, and the slave monitor 106-1 is connected to a secondary output terminal 107-1 of the isolation transformer 103-1. The master monitor 104 may send a control signal for controlling on/off of each aviation light (105-1, 105-2, 105-3, . . . ) to each slave monitor (106-1, 106-2, 106-3, . . . ), and each slave monitor (106-1, 106-2, 106-3, . . . ) may send status information of the corresponding aviation light to the master monitor 104. Under control of the corresponding slave monitor, an aviation light sets up a connection to a secondary output terminal of a corresponding isolation transformer (that is, the aviation light is powered on and turns on), or breaks a connection from a secondary output terminal of an isolation transformer (that is, the aviation light is powered off and turns off). In this way, the slave monitor may control on/off of the corresponding aviation light based on the control signal from the master monitor. For example, under control of the slave monitor 106-1, the aviation light 105-1 sets up the connection to the secondary output terminal 107-1 of the isolation transformer 103-1, obtains power from the secondary output terminal 107-1 of the isolation transformer 103-1, and turns on. For another example, under control of the slave monitor 106-1, the aviation light 105-1 breaks the connection from the secondary output terminal 107-1 of the isolation transformer 103-1, and the aviation light 105-1 is powered off and turns off.

In a series loop shown in FIG. 1, the master monitor 104 communicates with a server 108, obtains a control signal from the server 108, and then modulates the control signal onto a power line carrier signal. After the power line carrier signal is transmitted to the slave monitor using the cable, the slave monitor may obtain the control signal from the power line carrier signal through demodulation in order to obtain an instruction for controlling the aviation light.

The power line carrier signal is usually a high-frequency current signal that carries information and that may be transmitted using a cable.

In an aviation light control system shown in FIG. 1, the power line carrier signal inevitably needs to pass through a primary coil of the isolation transformer to reach the secondary output terminal of the isolation transformer, before the power line carrier signal can be transmitted to the slave monitor. However, attenuation occurs after the power line carrier signal passes through the isolation transformer.

In addition, because the master monitor is connected to the constant current regulator in parallel, all power line carrier signals sent by the master monitor to the slave monitors need to pass through the entire series loop. That is, a transmission path of the power line carrier signal is the entire loop, resulting in an excessively long transmission path and further increasing signal attenuation. As a result, signal attenuation in the aviation light control system in FIG. 1 is relatively large, causing communication to be highly unreliable.

Figure 2:
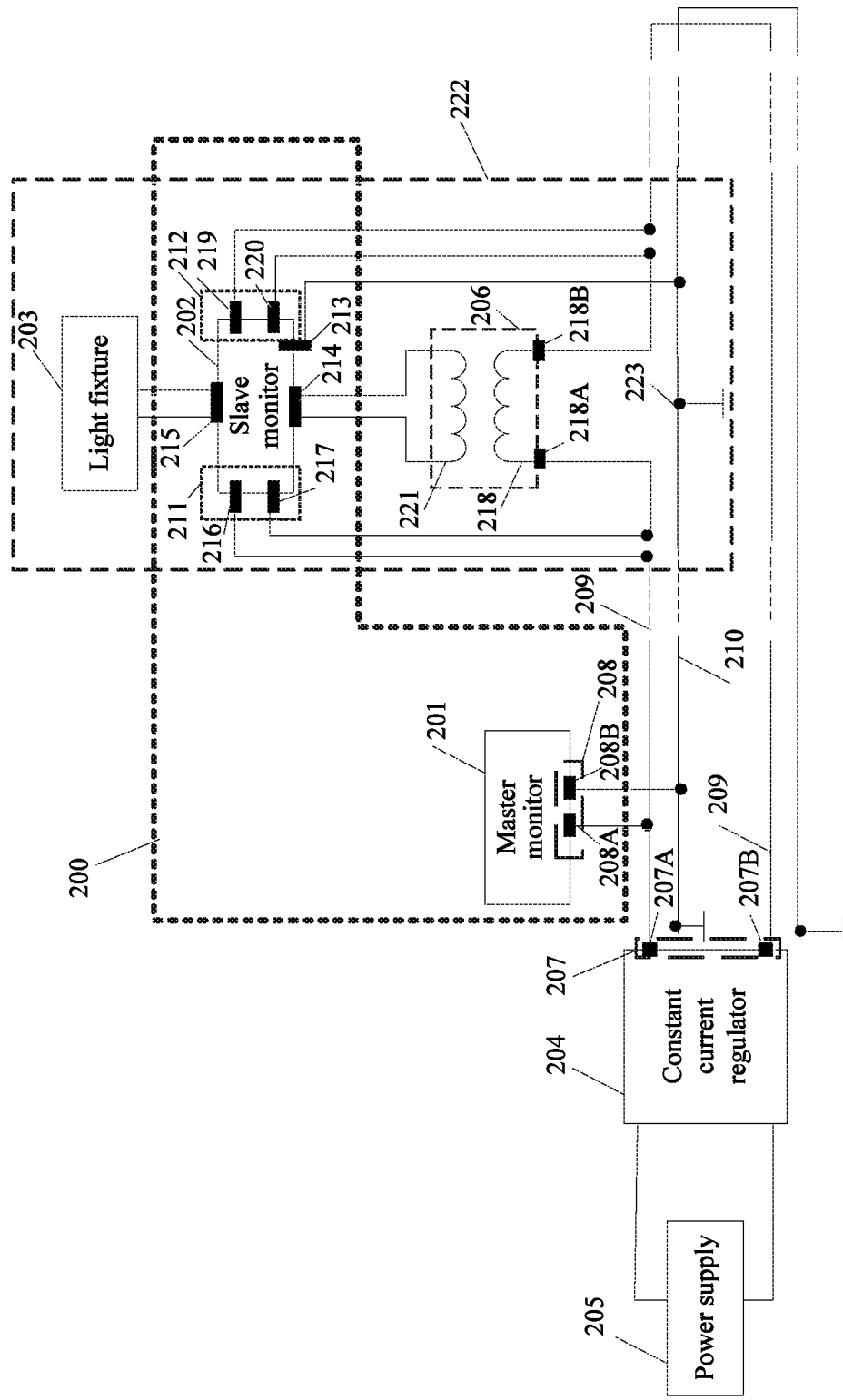
FIG. 2 is a schematic structural diagram of a light control system according to this application.

FIG. 2 shows a light control system according to an embodiment of this application. A light control system 200 includes a master monitor 201 and a slave monitor 202, and the master monitor 201 and the slave monitor 202 are connected using a cable.

The master monitor 201 is configured to generate a first power line carrier signal, and send the first power line carrier signal to the slave monitor 202 using the cable.

The slave monitor 202 is configured to directly receive the first power line carrier signal from the cable, and control a light fixture 203 based on the first power line carrier signal.

The light control system 200 is usually used in a visual aviation light control system that includes a constant current regulator 204, a power supply 205, and an isolation transformer 206. The power supply 205 is connected to an input port of the constant current regulator 204, an output port 207 of the constant current regulator 204 is connected to the cable to form a loop, and the isolation transformer 206 is connected to the loop in series.

The master monitor 201 is deployed at a position close to the output port 207 of the constant current regulator 204. The master monitor 201 is connected to a conducting wire 209 and a grounding medium 210 of the cable that are close to the output port 207 of the constant current regulator 204. Further, the master monitor 201 includes a primary carrier communication port 208, and the primary carrier communication port 208 is configured to connect to the cable. The primary carrier communication port 208 is connected to the conducting wire 209 and the grounding medium 210 of the cable. As shown in FIG. 2, the primary carrier communication port 208 includes two communication pins 208A and 208B that are respectively connected to the conducting wire 209 and the grounding medium 210 of the cable.

The output port 207 of the constant current regulator 204 includes two terminals (207A and 207B), and the two terminals (207A and 207B) are connected to two ends of the conducting wire 209 of the cable to form a loop. An electrical signal generated in the constant current regulator 204 may be transmitted on the conducting wire 209 of the entire cable.

Further, as shown in FIG. 2, the slave monitor 202 includes a first wiring terminal group 211, a second wiring terminal group 212, a grounding terminal 213, a first power supply terminal 214, and a second power supply terminal 215.

The first wiring terminal group 211 includes a first wiring terminal 216 and a second wiring terminal 217, the first wiring terminal 216 is configured to connect to the conducting wire 209 of the cable, and the second wiring terminal 217 is configured to connect to a first primary wiring terminal 218A of the isolation transformer 206, where the first primary wiring terminal 218A is one end of a primary coil 218 of the isolation transformer 206.

The second wiring terminal group 212 includes a third wiring terminal 219 and a fourth wiring terminal 220, the third wiring terminal 219 is configured to connect to the conducting wire 209 of the cable, and the fourth wiring terminal 220 is configured to connect to a second primary wiring terminal 218B of the isolation transformer 206, where the second primary wiring terminal 218B is the other end of the primary coil 218 of the isolation transformer 206.

The grounding terminal 213 is configured to connect to the grounding medium 210 of the cable.

The first power supply terminal 214 is configured to connect to a secondary output terminal 221 of the isolation transformer 206, and the second power supply terminal 215 is configured to connect to the light fixture 203.

Optionally, the slave monitor 202 and the isolation transformer 206 in FIG. 2 may be placed in a light box 222. The cable may be routed into the light box 222 from one side of the light box 222 to transmit the power line carrier signal and the electrical signal for the slave monitor 202 and the isolation transformer 206 in the light box 222, and then the cable is routed out from the other side of the light box 222. The grounding medium 210 of the cable in the light box 222 may be grounded using a grounding end 223 in the light box 222.

In the light control system shown in FIG. 2, the first power line carrier signal generated by the master monitor is transmitted using a loop formed by the conducting wire and the grounding medium of the cable. When the first power line carrier signal arrives at the isolation transformer corresponding to the slave monitor through the cable, the first power line carrier signal does not need to pass through the isolation transformer, but may directly enter the slave monitor using the first wiring terminal, and flow out from the slave monitor using the grounding terminal.

The electrical signal output from the output port of the constant current regulator is transmitted on the conducting wire of the cable. When the electrical signal arrives at the isolation transformer through the cable, electromagnetic induction is generated at the primary coil of the isolation transformer, and an electrical signal is generated at the secondary output terminal of the isolation transformer. The electrical signal generated at the secondary output terminal of the isolation transformer passes through the first power supply terminal and the second power supply terminal of the slave monitor and arrives at the light fixture to supply power to the light fixture.

It can be learned from the foregoing descriptions that the primary carrier communication port of the master monitor is connected to the conducting wire and the grounding medium of the cable. That is, the transmission path of the first power line carrier signal generated by the master monitor is the loop formed by the conducting wire and the grounding medium of the cable, instead of an entire loop with the constant current regulator connected therein. In this way, the transmission path of the first power line carrier signal is shortened, attenuation of the first power line carrier signal is further reduced, and a problem that loop impedance mismatch after long-term use affects normal operation of the system can be avoided. The slave monitor is connected to the conducting wire of the cable using the first wiring terminal, and is connected to the grounding medium of the cable using the grounding terminal such that the slave monitor can receive the first power line carrier signal directly using the cable, and does not need to obtain the first power line carrier signal from the secondary output terminal of the isolation transformer. This can avoid problems that the first power line carrier signal is attenuated when the signal passes through the isolation transformer, and that signal quality is affected by leakage inductance of the isolation transformer.

In this embodiment of the present disclosure, the cable includes the conducting wire and the grounding medium. The grounding medium may be a shield layer wrapped around an outer layer of the wire, and the shield layer is configured to shield electromagnetic interference caused by an external signal to a signal transmitted on the conducting wire, and is usually grounded. Alternatively, the grounding medium may be another conducting wire and is used for grounding.

The master monitor usually includes a PLC module. The PLC module of the master monitor is configured to generate a first power line carrier signal, and send the generated first power line carrier signal to the slave monitor using the cable. There is a plurality of manners in which the master monitor generates the first power line carrier signal. For example, the master monitor may communicate with a server and generate the first power line carrier signal based on an instruction sent by the server.

Figure 3:
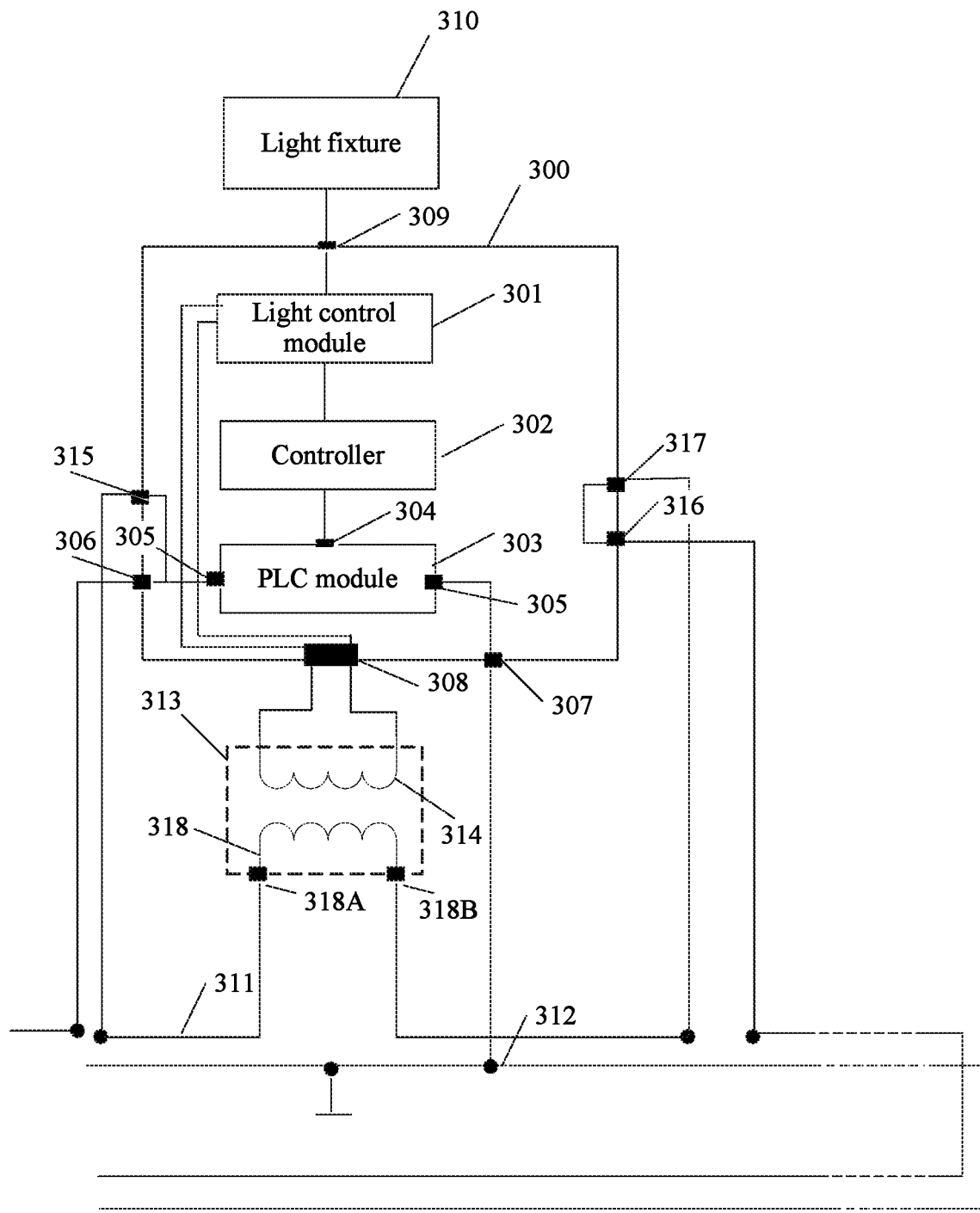
FIG. 3 is a schematic structural diagram of a monitor according to this application.

As shown in FIG. 3, FIG. 3 is a schematic diagram of an internal structure of a slave monitor. The slave monitor 300 includes a light control module 301, a controller 302, and a PLC module 303.

The PLC module 303 includes a digital communication port 304 and a carrier communication port 305, the digital communication port 304 is connected to the controller 302, and the carrier communication port 305 is connected to a first wiring terminal 306 and a grounding terminal 307. The PLC module 303 is configured to obtain, through demodulation, a control signal from a first power line carrier signal transmitted on a cable, and send the control signal to the controller 302.

The controller 302 is connected to the light control module 301, and is configured to control the light control module 301 based on the control signal.

The light control module 301 is connected to a first power supply terminal 308 and a second power supply terminal 309.

The light control module 301 is configured to, under control of the controller 302, maintain a connection between the first power supply terminal 308 and the second power supply terminal 309 to turn on a light fixture 310, or break a connection between the first power supply terminal 308 and the second power supply terminal 309 to turn off the light fixture 310.

The first wiring terminal 306 is connected to a conducting wire 311 of the cable, the grounding terminal 307 is connected to a grounding medium 312 of the cable, the first power supply terminal 308 is connected to a secondary output terminal 314 of an isolation transformer 313, and the second power supply terminal 309 is connected to the light fixture 310.

The slave monitor shown in FIG. 3 further includes a second wiring terminal 315, a third wiring terminal 316, and a fourth wiring terminal 317. The second wiring terminal 315 is connected to a first primary wiring terminal 318A of the isolation transformer 313, the third wiring terminal 316 is connected to the conducting wire 311 of the cable, and the fourth wiring terminal 317 is connected to a second primary wiring terminal 318B of the isolation transformer 313. In addition, the first wiring terminal 306 is connected to the second wiring terminal 315, and the third wiring terminal 316 is connected to the fourth wiring terminal 317.

In the slave monitor shown in FIG. 3, the first power line carrier signal on the cable enters the slave monitor using the first wiring terminal 306, passes through the carrier communication port 305 connected to the first wiring terminal 306, and arrives at the PLC module 303. After passing through the PLC module 303, the first power line carrier signal is transmitted to the grounding medium of the cable using the grounding terminal 307 connected to the carrier communication port 305. The PLC module 303 generates a control signal based on the first power line carrier signal, and sends the control signal to the controller 302 using the digital communication port 304. The controller 302 controls the light control module based on the control signal.

In the slave monitor shown in FIG. 3, an electrical signal on the cable enters the slave monitor using the first wiring terminal 306, and is transmitted from the second wiring terminal 315 to a primary coil 318 of the isolation transformer 313. Then the electrical signal in the primary coil 318 of the isolation transformer 313 is transmitted to the cable using the third wiring terminal 316 and the fourth wiring terminal 317. The electrical signal in the primary coil 318 of the isolation transformer 313 causes generation of an electrical signal at the secondary output terminal 314 of the isolation transformer 313. The electrical signal at the secondary output terminal 314 of the isolation transformer 313 enters the slave monitor 300 from the first power supply terminal 308, arrives at the light control module 301 connected to the first power supply terminal 308, and then arrives at the light fixture 310 through the second power supply terminal 309 connected to the light control module 301. That is, the light control module 301 can implement connectivity of a path between the light fixture 310 and the secondary output terminal 314 of the isolation transformer 313 using the first power supply terminal 308 and the second power supply terminal 309 such that the light fixture 310 obtains power from the secondary output terminal 314 of the isolation transformer 313, and obtains the electrical signal at the secondary output terminal 314 of the isolation transformer 313.

The controller 302 may connect or disconnect the path between the light fixture 310 and the secondary output terminal 314 of the isolation transformer by controlling the light control module 301, to supply or cut off power to the light fixture 310. Further, the controller 302 supplies or cuts off power to the light fixture 310 by controlling the light control module 301 to set up or break the connection between the first power supply terminal 308 and the second power supply terminal 309.

The carrier communication port 305 of the PLC module 303 of the slave monitor may be directly connected to the conducting wire 311 and the grounding medium 312 of the cable using the first wiring terminal 306 and the grounding terminal 307. When a master monitor transmits the first power line carrier signal using the conducting wire and the grounding medium of the cable, the PLC module 303 of the slave monitor may directly receive the first power line carrier signal from the cable, and then send the control signal obtained from the first power line carrier signal through demodulation to the controller 301. In this way, the slave monitor can obtain a power line carrier signal without requiring the isolation transformer 313, thereby avoiding a problem of unreliable communication due to attenuation of the power line carrier signal caused by the isolation transformer.

Optionally, to enable the master monitor to obtain a light fixture status in a timely manner, the slave monitor may report the light fixture status to the master monitor. The slave monitor may proactively report the light fixture status periodically, or may report the light fixture status when the light fixture status changes. Alternatively, the slave monitor may report the light fixture status after receiving a power line carrier signal that is sent by the master monitor and that is used to instruct to report the light fixture status.

Further, the light control module 301 may further indicate the light fixture status, and save the light fixture status. The controller 302 may read the light fixture status from the light control module 301, generate a report signal based on the light fixture status that is read, and send the report signal to the PLC module 303. Then, the PLC module 303 modulates the report signal onto a second power line carrier signal, and directly transmits the modulated second power line carrier signal to the cable (using the first wiring terminal 306 and the grounding terminal 307 of the slave monitor). When the second power line carrier signal is transmitted on the cable, the master monitor may receive, using a primary carrier communication port, the second power line carrier signal transmitted on the cable, and obtain the light fixture status based on the second power line carrier signal.

It should be noted that there may be a plurality of light fixture states recorded by the light control module 301, for example, whether a current exists in the light fixture, whether the light fixture is wet, or a current temperature of the light fixture. Any information that can represent a light fixture status is applicable to this embodiment of this application.

Optionally, after the controller 302 controls the light control module 301 based on the control signal obtained from the first power line carrier signal by the PLC module 303 through demodulation, the controller 302 may further feedback an acknowledgement signal to the master monitor to represent that the controller 302 has received the first power line carrier signal sent by the master monitor and has completed a corresponding operation on the light fixture 310 based on the control signal obtained from the first power line carrier signal through demodulation. Further, the controller 302 generates the acknowledgement signal, and sends the acknowledgement signal to the PLC module 303. The PLC module 303 modulates the acknowledgement signal onto a third power line carrier signal, and directly transmits the third power line carrier signal to the cable (using the first wiring terminal and the grounding terminal of the slave monitor). The master monitor may receive the third power line carrier signal from the cable, and determine that the slave monitor has received the first power line carrier signal sent previously and has completed the corresponding operation on the light fixture 310.

Figure 4:
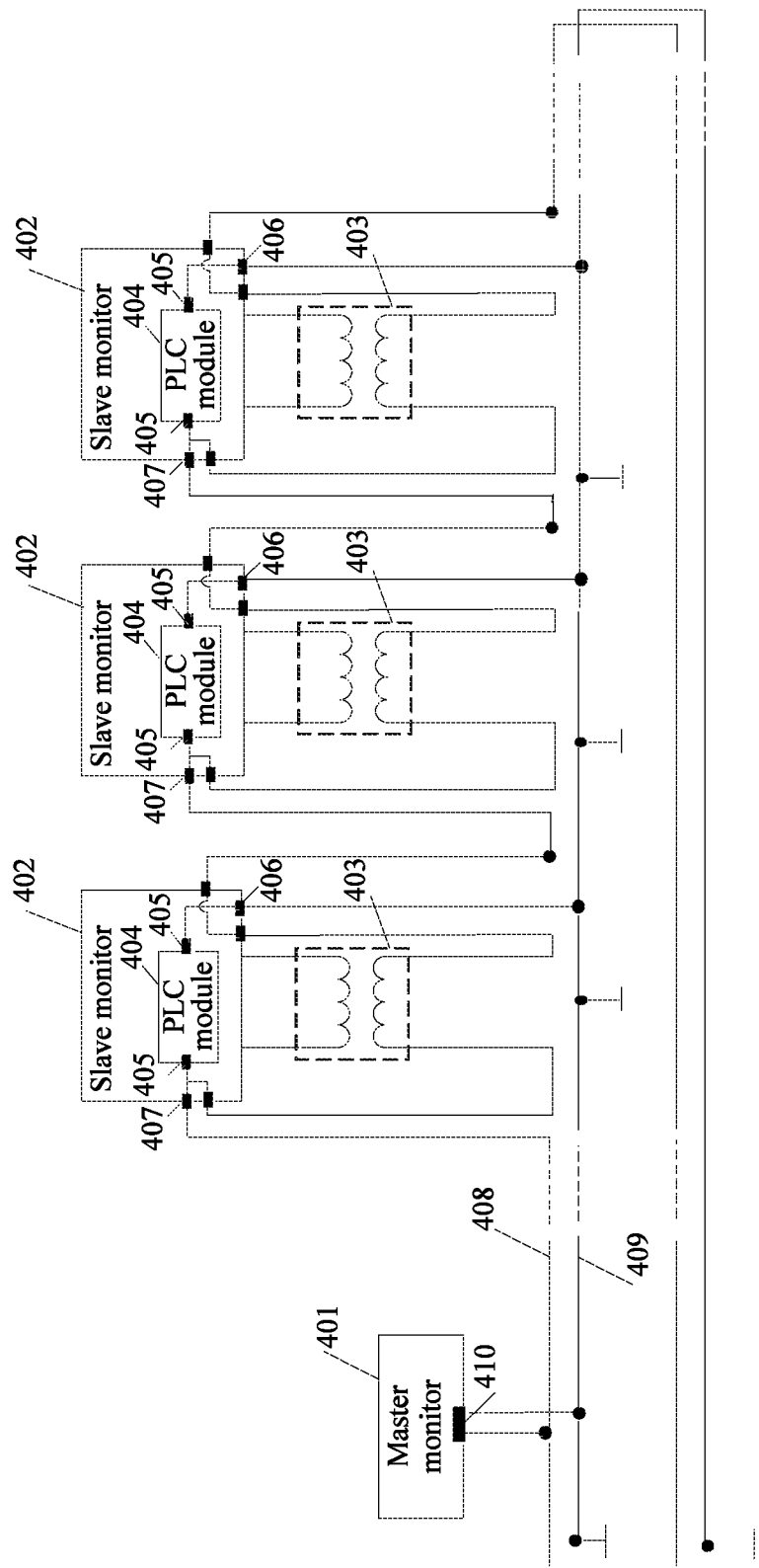
FIG. 4 is a schematic structural diagram of a light control system according to this application.

Optionally, as shown in FIG. 4, a light control system may include one master monitor 401 and a plurality of slave monitors 402. Each slave monitor 402 is connected to one isolation transformer 403, a carrier communication port 405 of a PLC module 404 of each slave monitor 402 is connected to a conducting wire 408 and a grounding medium 409 of a cable using a first wiring terminal 407 and a grounding terminal 406, and a primary carrier communication port 410 of the master monitor 401 is connected to the conducting wire 408 and the grounding medium 409 of the cable.

For any slave monitor, a transmission path of a power line carrier signal transmitted between the slave monitor and the master monitor is a loop formed by the conducting wire and the grounding medium of the cable between the slave monitor and the master monitor. This shortens the transmission path of the power line carrier signal and effectively controls attenuation of the power line carrier signal. The power line carrier signal transmitted between the slave monitor and the master monitor includes but is not limited to a first power line carrier signal, a second power line carrier signal, or a third power line carrier signal. In addition, based on a transmission direction of the power line carrier signal, an upper-level slave monitor may serve as a relay for a lower-level slave monitor to receive the power line carrier signal. This helps effectively inhibit the attenuation of the power line carrier signal.

Figure 5:
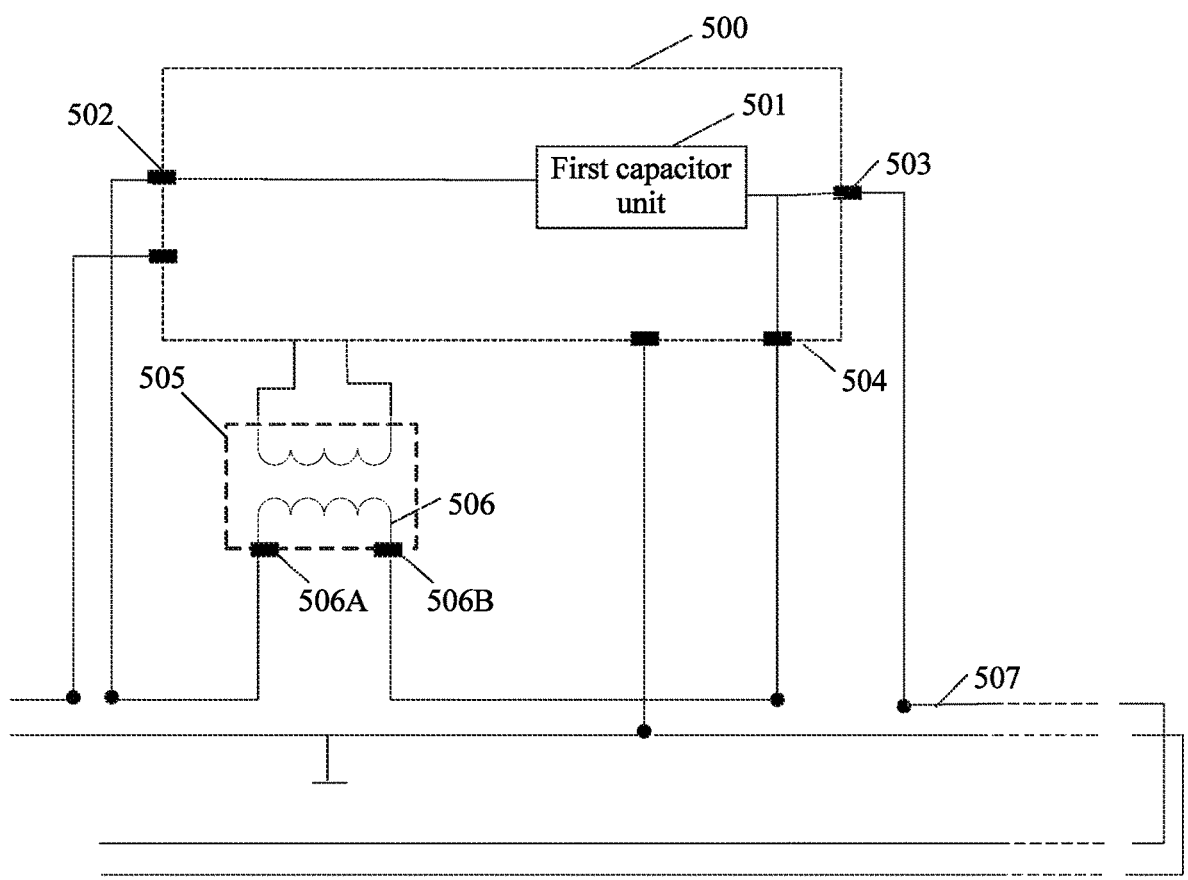
FIG. 5 is a schematic structural diagram of a first capacitor unit according to this application.

In a possible implementation, as shown in FIG. 5, when a light control system includes a plurality of slave monitors, to ensure that a power line carrier signal on a cable can pass through an isolation transformer without attenuation, a slave monitor 500 includes a first capacitor unit 501. One end of the first capacitor unit 501 is connected to a second wiring terminal 502, and the other end is connected to a third wiring terminal 503 and a fourth wiring terminal 504. The second wiring terminal 502 is connected to a first primary wiring terminal 506A of an isolation transformer 505, the fourth wiring terminal 504 is connected to a second primary wiring terminal 506B of the isolation transformer 505, and the third wiring terminal 503 is connected to a conducting wire 507 of the cable.

The second wiring terminal and the fourth wiring terminal are connected to the two wiring terminals of a primary coil 506 of the isolation transformer such that the first capacitor unit is located between the two wiring terminals of the primary coil of the isolation transformer, and is connected to the primary coil of the isolation transformer in parallel.

Generally, the power line carrier signal is a high-frequency current signal. Compared with the primary coil of the isolation transformer, the first capacitor unit can better transmit the high-frequency power line carrier signal and can effectively control signal attenuation.

Optionally, the first capacitor unit may include a capacitor, and may further include another component.

Figure 6:
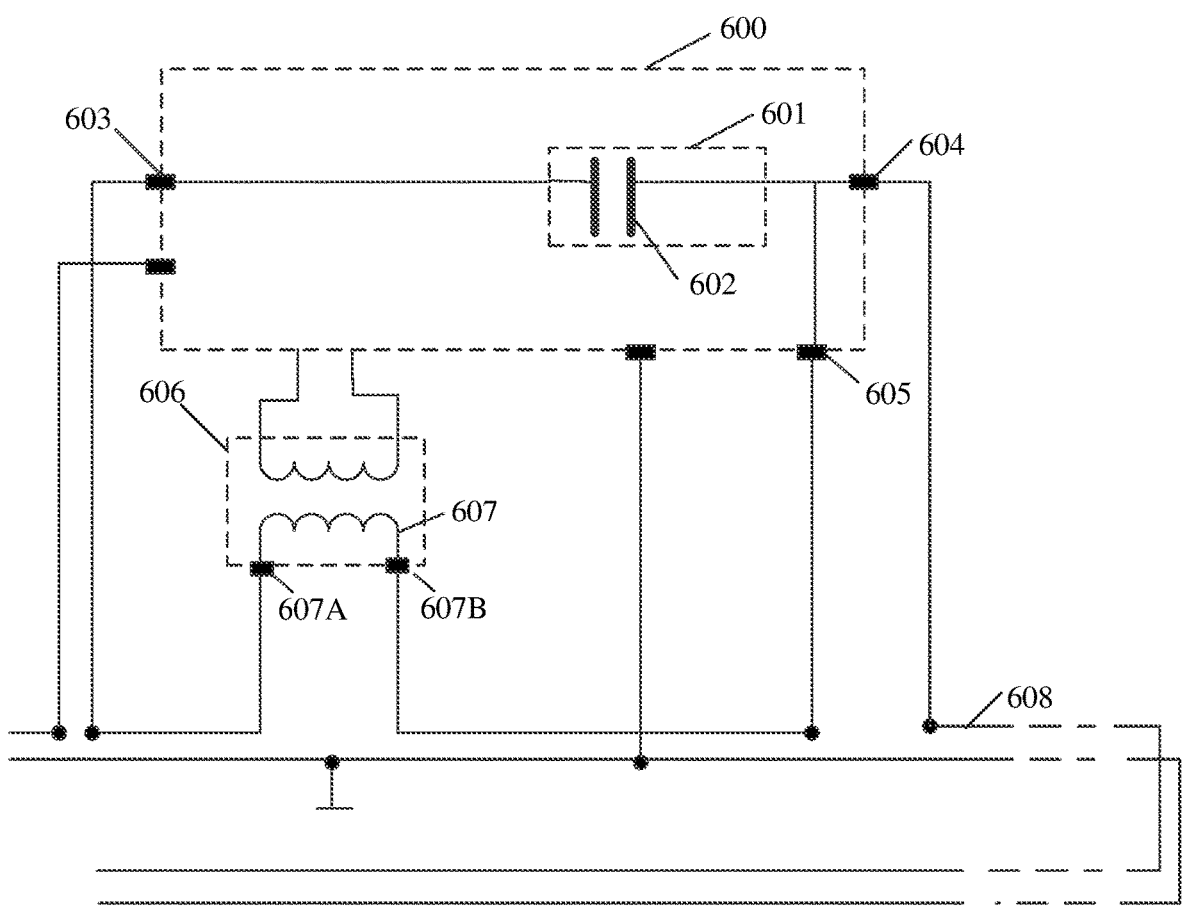
FIG. 6 is a schematic structural diagram of a first capacitor unit according to this application.

As shown in FIG. 6, a first capacitor unit 601 of a slave monitor 600 includes a first capacitor 602. One end of the first capacitor 602 is connected to a second wiring terminal 603, and the other end is connected to a third wiring terminal 604 and a fourth wiring terminal 605. The second wiring terminal 603 and the fourth wiring terminal 605 are respectively connected to wiring terminals (a first primary wiring terminal 607A and a second primary wiring terminal 607B) at two ends of a primary coil 607 of an isolation transformer 606, and the third wiring terminal 604 is connected to a conducting wire 608 of a cable. It should be noted that the first capacitor unit may include only one first capacitor, or may include a plurality of first capacitors. This may be set based on a specific scenario and is not limited herein.

Alternatively, the first capacitor unit may include a first capacitor and a first fuse.

Figure 7A:
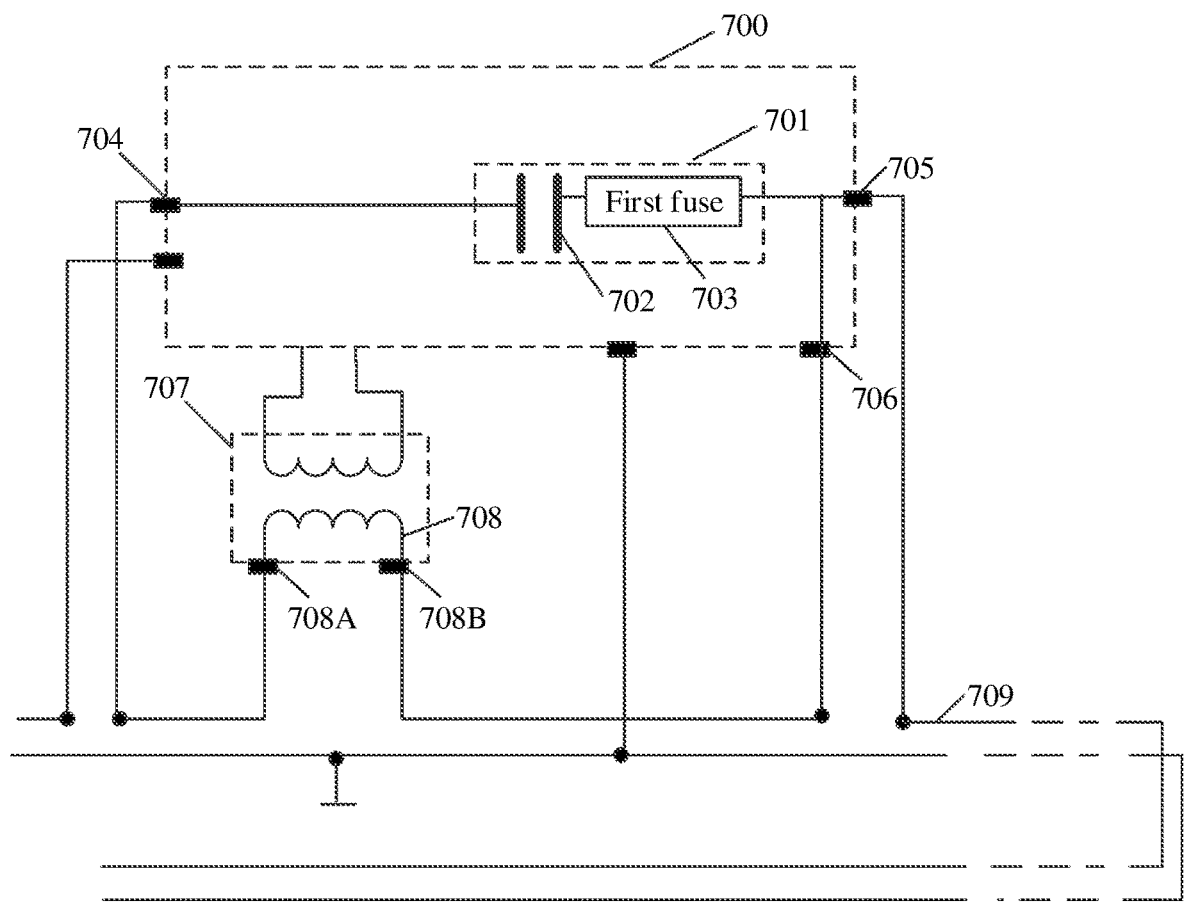
FIG. 7A and FIG. 7B are schematic structural diagrams of a first capacitor unit according to this application.

As shown in FIG. 7A, for example, a first capacitor unit 701 of a slave monitor 700 includes a first capacitor 702 and a first fuse 703. One end of the first capacitor 702 is connected to one end of the first fuse 703, the other end of the first capacitor 702 is connected to a second wiring terminal 704, and the other end of the first fuse 703 is connected to a third wiring terminal 705 and a fourth wiring terminal 706. The second wiring terminal 704 and the fourth wiring terminal 706 are respectively connected to wiring terminals (708A and 708B) at two ends of a primary coil 708 of an isolation transformer 707, and the third wiring terminal 705 is connected to a conducting wire 709 of a cable.

Figure 7B:
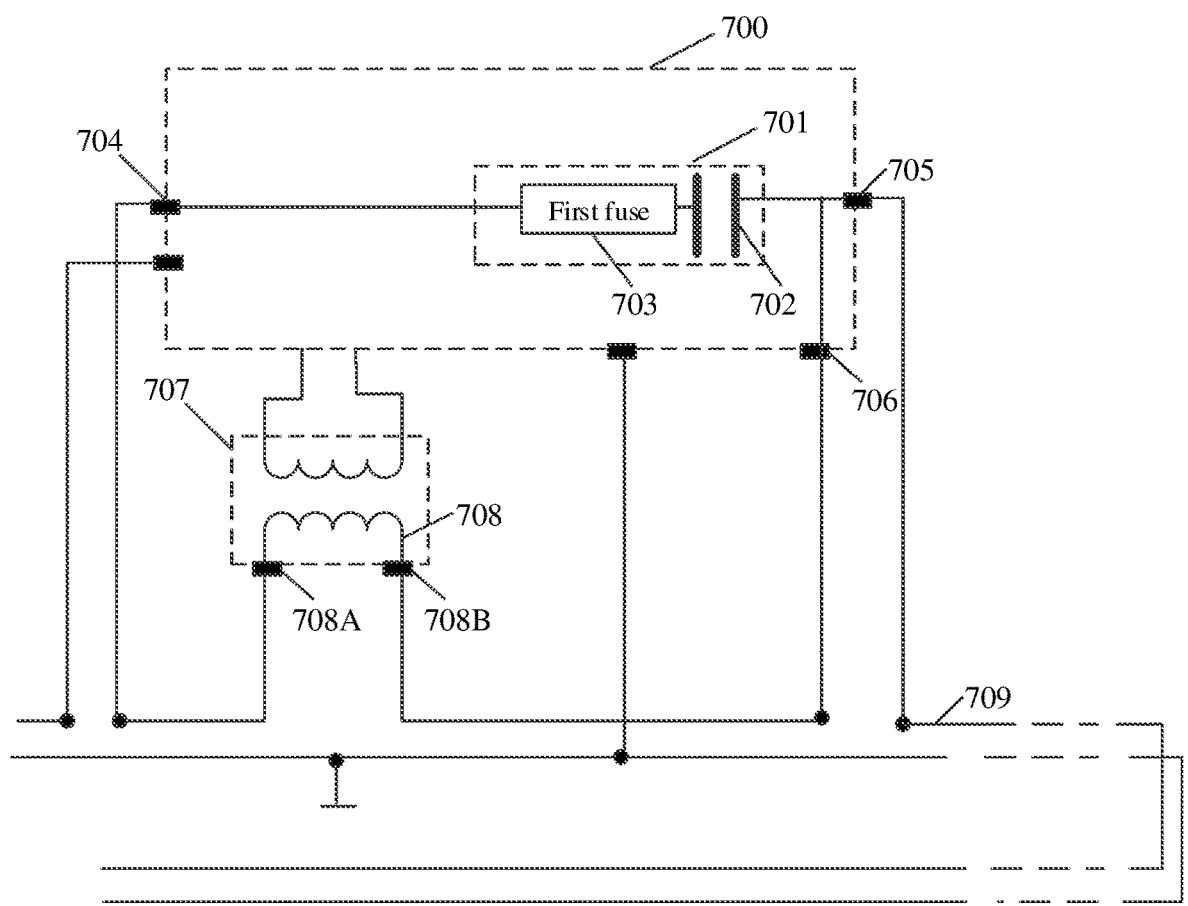

As shown in FIG. 7B, for example, a first capacitor unit 701 of a slave monitor 700 includes a first capacitor 702 and a first fuse 703. One end of the first capacitor 702 is connected to one end of the first fuse 703, the other end of the first fuse 703 is connected to a second wiring terminal 704, and the other end of the first capacitor 702 is connected to a third wiring terminal 705 and a fourth wiring terminal 706. The second wiring terminal 704 and the fourth wiring terminal 706 are respectively connected to wiring terminals (708A and 708B) at two ends of a primary coil 708 of an isolation transformer 707, and the third wiring terminal 705 is connected to a conducting wire 709 of a cable.

When the first capacitor breaks down, the primary coil of the isolation transformer may be short-circuited and cannot supply power to a light fixture. If the first capacitor is connected to the first fuse in series, after the first capacitor breaks down, the first fuse melts and breaks a connection because of an excessively large current. This can prevent the primary coil of the isolation transformer from being short-circuited, and a power line carrier signal and an electrical signal can still be transmitted using the isolation transformer.

It should be noted that the first capacitor unit may include a plurality of first capacitors and a plurality of first fuses. A specific connection manner is not limited herein. Any connection manner that enables the first fuse to break a connection when the first capacitor breaks down is applicable to this embodiment of the present disclosure.

Figure 8:
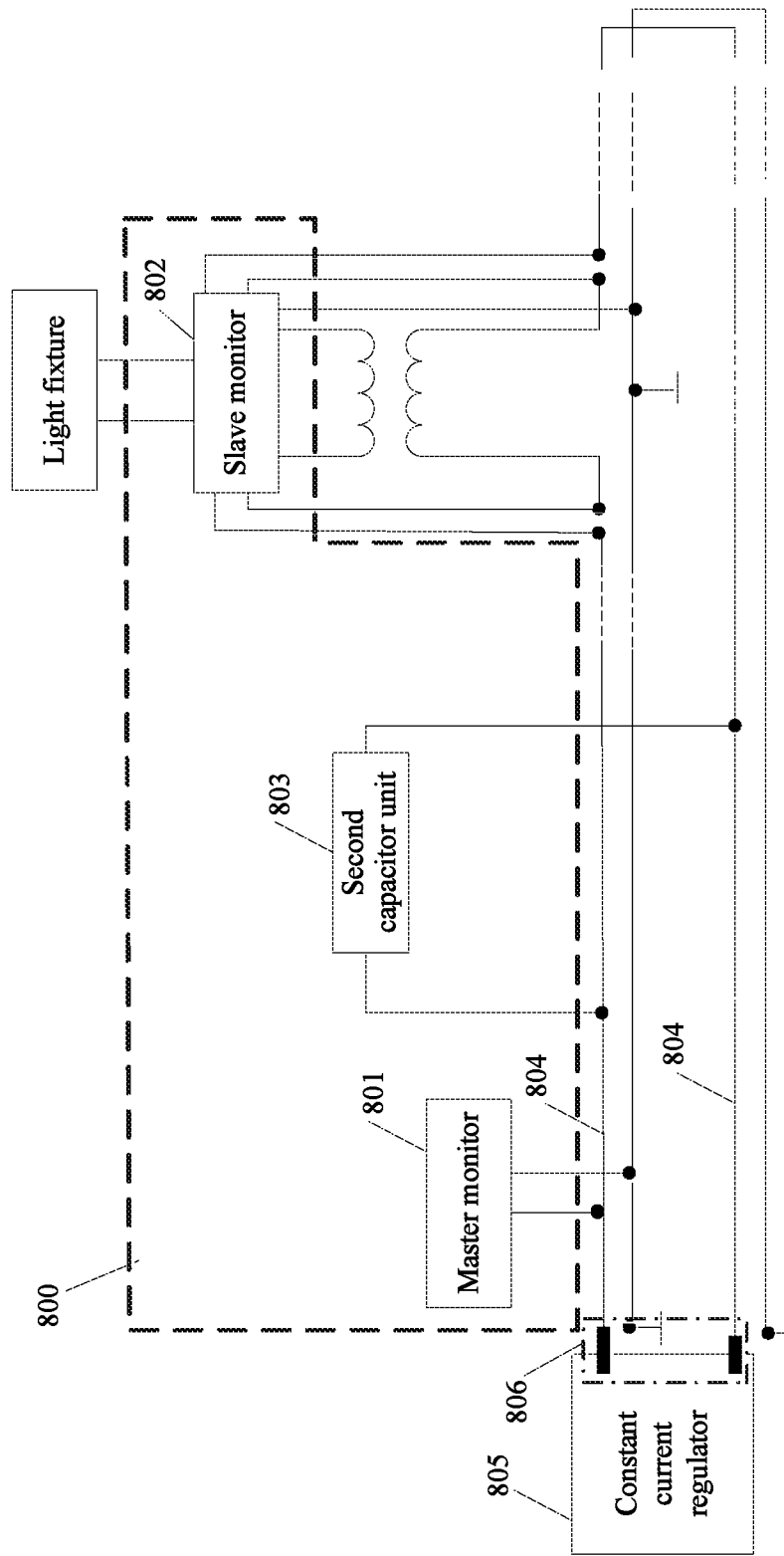
FIG. 8 is a schematic structural diagram of a second capacitor unit according to this application.

Optionally, as shown in FIG. 8, apart from a master monitor 801 and a slave monitor 802, a light control system 800 may further include a second capacitor unit 803. Two ends of the second capacitor unit 803 are configured to connect to two ends of a conducting wire 804 of a cable that are close to an output port 806 of a constant current regulator 805. Further, one end of the second capacitor unit 803 is configured to connect to the conducting wire 804 close to one terminal of the output port 806 of the constant current regulator 805, and the other end of the second capacitor unit 803 is configured to connect to the conducting wire 804 close to the other terminal of the output port 806 of the constant current regulator 805.

The two ends of the second capacitor unit are connected to the conducting wire of the cable, and located at two different terminals of the output port of the constant current regulator, and the second capacitor unit is connected to the constant current regulator in parallel.

In actual application, the light control system may include many slave monitors, and a loop formed by a constant current regulator and the isolation transformer is relatively long. To enable fast transmission of a power line carrier signal on the cable, a first power line carrier signal at one terminal of the output port of the constant current regulator may be transmitted to the other terminal using the second capacitor unit such that a slave monitor close to the output port of the constant current regulator can receive the first power line carrier signal relatively quickly. In addition, attenuation of the first power line carrier signal transmitted using the second capacitor unit is relatively small such that a bit error rate of the first power line carrier signal received by the slave monitor close to the output port of the constant current regulator is low.

It should be noted that the second capacitor unit only needs to connect to two ends of the conducting wire close to the output port of the constant current regulator, and the second capacitor unit may be located between the master monitor and the slave monitor, or may be located between the master monitor and the constant current regulator.

Further, the second capacitor unit may include a capacitor, and may further include another component.

Figure 9:
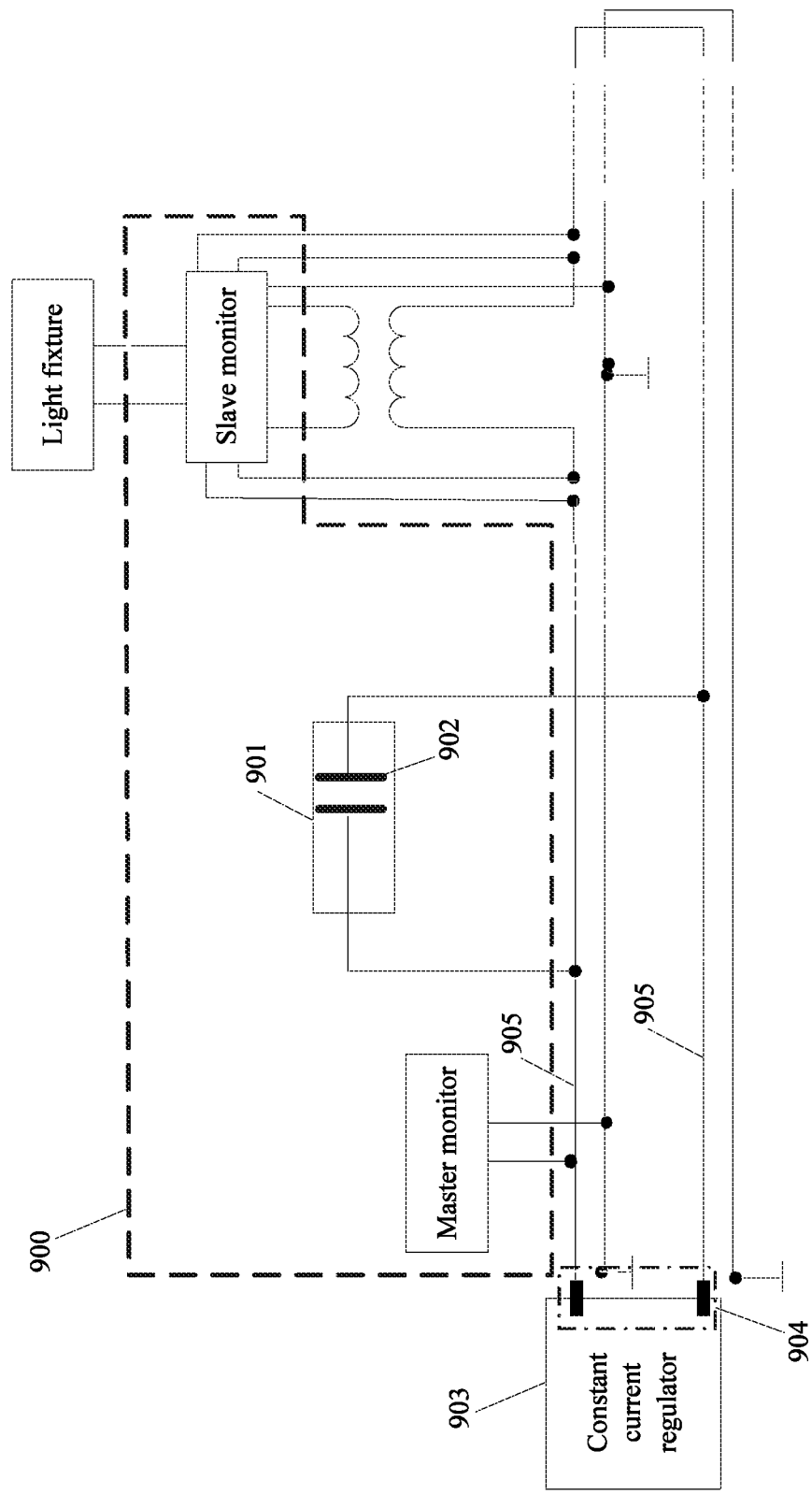
FIG. 9 is a schematic structural diagram of a second capacitor unit according to this application.

As shown in FIG. 9, a second capacitor unit 901 of a light control system 900 includes a second capacitor 902, and two ends of the second capacitor 902 are respectively connected to a conducting wire 905, of a cable, close to an output port 904 of a constant current regulator 903.

It should be noted that the second capacitor unit may include only one second capacitor, or may include a plurality of second capacitors. This may be set based on a specific scenario and is not limited herein.

Alternatively, the second capacitor unit may include a second capacitor and a second fuse.

Figure 10A:
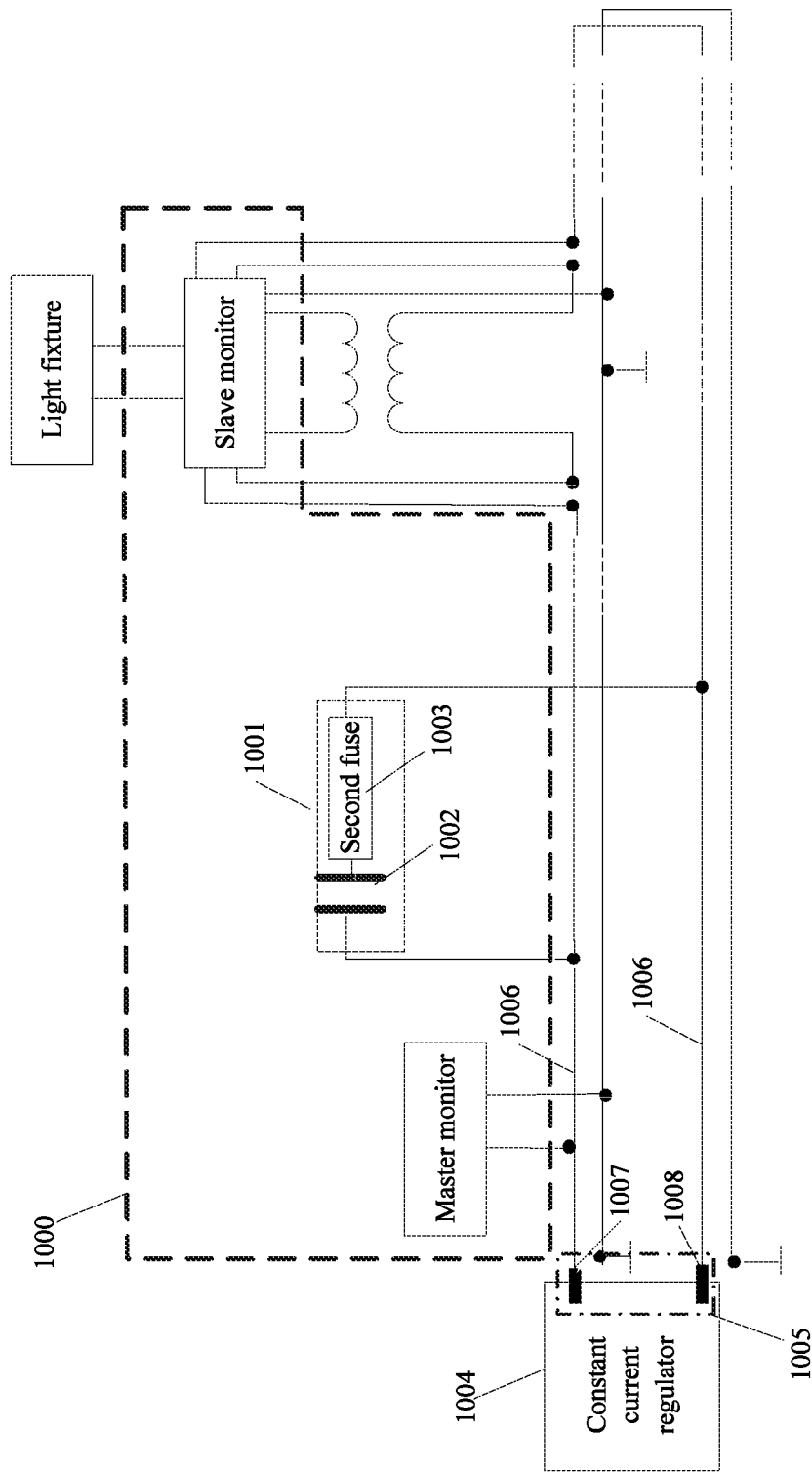
FIG. 10A and FIG. 10B are schematic structural diagrams of a second capacitor unit according to this application.

As shown in FIG. 10A, for example, a second capacitor unit 1001 of a light control system 1000 includes a second capacitor 1002 and a second fuse 1003. One end of the second capacitor 1002 is connected to one end of the second fuse 1003, and the other end of the second capacitor 1002 and the other end of the second fuse 1003 are configured to connect to a conducting wire 1006, of a cable, close to an output port 1005 of a constant current regulator 1004. Further, the other end of the second capacitor 1002 is configured to connect to the conducting wire 1006, of the cable, close to one terminal 1007 of the output port 1005 of the constant current regulator 1004, and the other end of the second fuse 1003 is configured to connect to the conducting wire 1006, of the cable, close to the other terminal 1008 of the output port 1005 of the constant current regulator 1004.

Figure 10B:
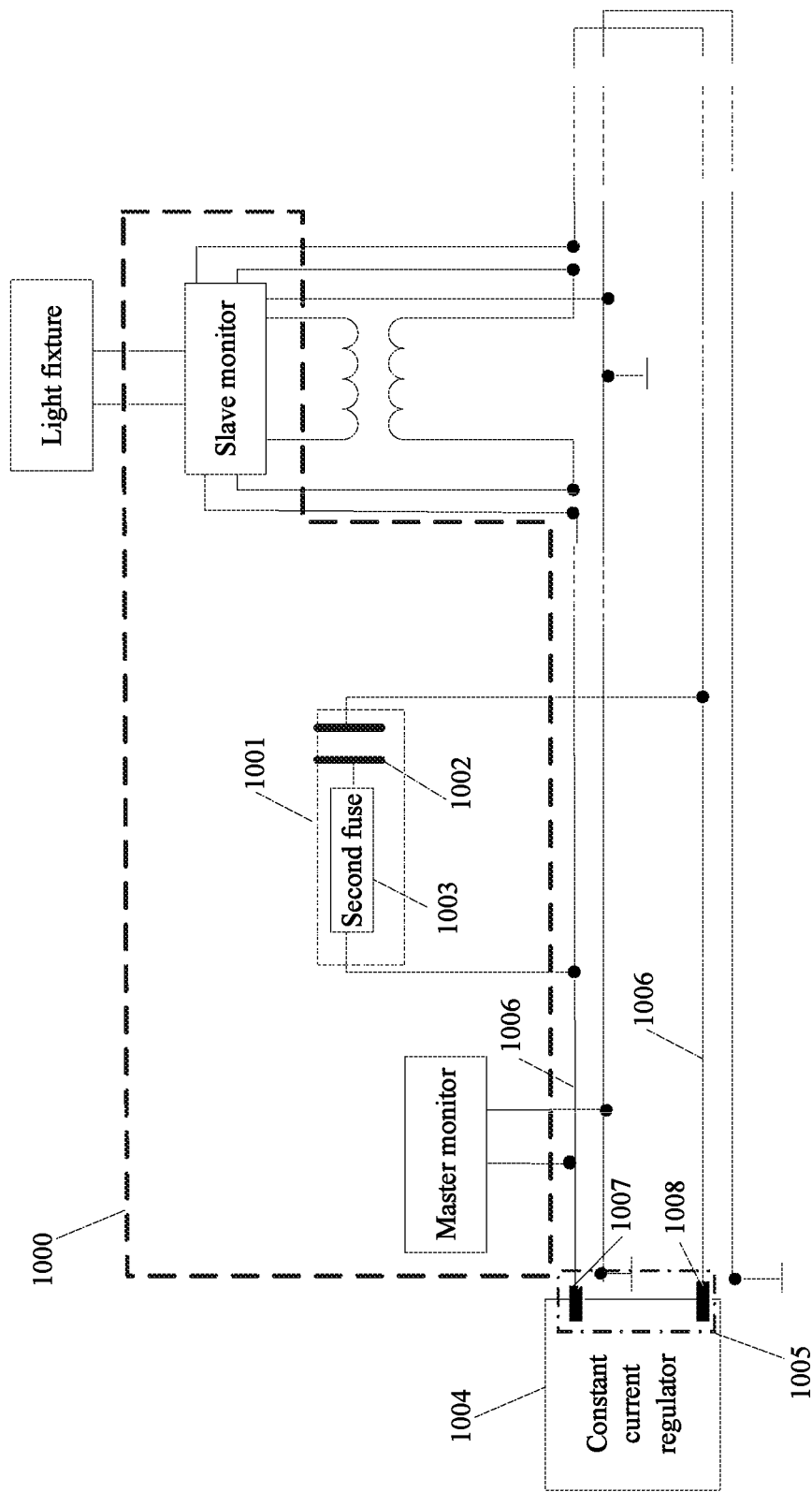

As shown in FIG. 10B, for example, a second capacitor unit 1001 of a light control system 1000 includes a second capacitor 1002 and a second fuse 1003. One end of the second capacitor 1002 is connected to one end of the second fuse 1003, and the other end of the second capacitor 1002 and the other end of the second fuse 1003 are configured to connect to a conducting wire 1006, of a cable, close to an output port 1005 of a constant current regulator 1004. Further, the other end of the second fuse 1003 is configured to connect to the conducting wire 1006, of the cable, close to one terminal 1007 of the output port 1005 of the constant current regulator 1004, and the other end of the second capacitor 1002 is configured to connect to the conducting wire 1006, of the cable, close to the other terminal 1008 of the output port 1005 of the constant current regulator 1004.

When the second capacitor breaks down, an entire loop may be short-circuited, making the light control system fail to work normally. If the second capacitor is connected to the second fuse in series, after the second capacitor breaks down, the second fuse is disconnected because of an excessively large current. This can prevent the loop from being short-circuited, thereby ensuring normal operation of the light control system.

It should be noted that the second capacitor unit may include a plurality of second capacitors and a plurality of second fuses. A specific connection manner is not limited herein. Any connection manner that enables the second fuse to break a connection when the second capacitor breaks down is applicable to this embodiment of the present disclosure.

Figure 11:
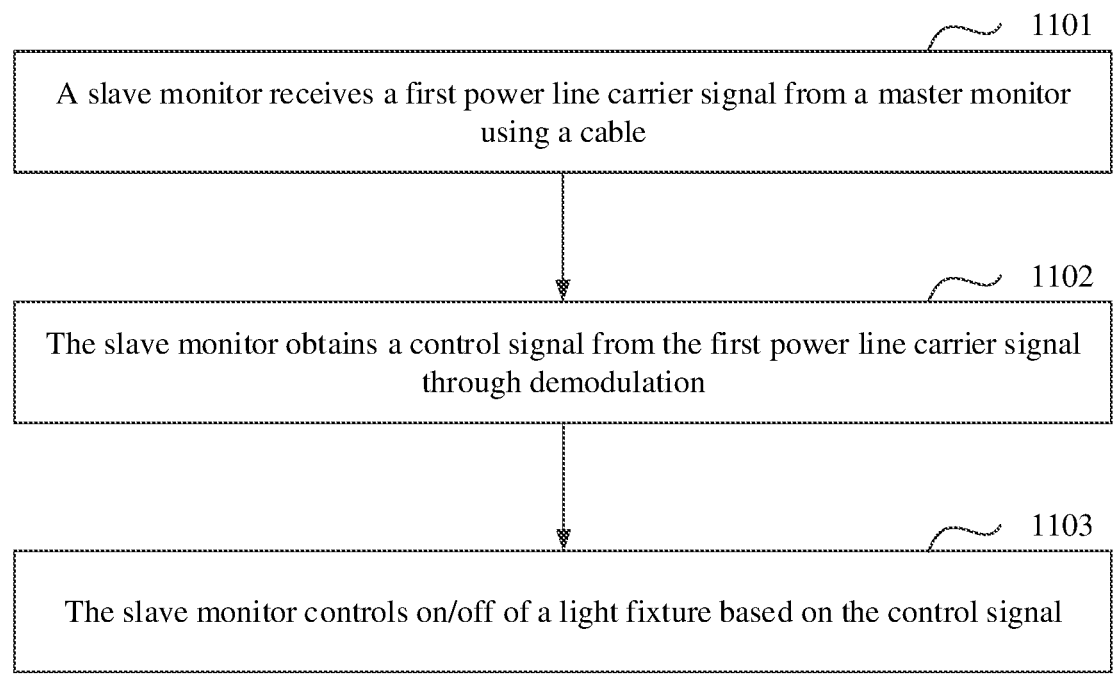
FIG. 11 is a schematic flowchart diagram of a light fixture control method according to this application.

As shown in FIG. 11, an embodiment of this application provides a light fixture control method. The method includes the following steps.

Step 1101: A slave monitor receives a first power line carrier signal from a master monitor using a cable.

Step 1102: The slave monitor obtains a control signal from the first power line carrier signal through demodulation.

Step 1103: The slave monitor controls on/off of a light fixture based on the control signal.

The slave monitor is directly connected to the cable, and the light fixture is connected to the slave monitor.

The slave monitor directly receives, using the cable, a power line carrier signal sent by the master monitor, and then controls a light fixture. That is, the power line carrier signal can be received by the slave monitor without passing through an isolation transformer such that attenuation of the power line carrier signal received by the slave monitor is effectively controlled, and the light fixture can be controlled more efficiently.

Further, a schematic structural diagram of the slave monitor is shown in FIG. 2 and FIG. 3, and details are not described herein.

When the slave monitor controls on/off of the light fixture based on the control signal, the slave monitor sets up or breaks a connection between a secondary output terminal of the isolation transformer and the light fixture in order to control on/off of the light fixture.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A monitor, comprising:
  a first wiring terminal group comprising a first wiring terminal and a second wiring terminal, wherein the first wiring terminal is configured to couple to a conducting wire of a cable, and wherein the second wiring terminal is configured to couple to a first primary wiring terminal of an isolation transformer;
  a second wiring terminal group coupled to the first wiring terminal group and comprising a third wiring terminal and a fourth wiring terminal, wherein the third wiring terminal is configured to couple to the conducting wire of the cable, and wherein the fourth wiring terminal is configured to couple to a second primary wiring terminal of the isolation transformer;
  a grounding terminal configured to couple to a grounding medium of the cable;
  a first power supply terminal configured to couple to a secondary output terminal of the isolation transformer; and
  a second power supply terminal configured to couple to a light fixture.

2. The monitor of claim 1, further comprising:
  a light control circuit coupled to the first power supply terminal and the second power supply terminal;
  controller coupled to the light control circuit; and
  a power line communication (PLC) circuit, wherein the PLC circuit comprises a digital communication port and a carrier communication port, wherein the digital communication port is coupled to the controller, wherein the carrier communication port is coupled to the first wiring terminal and the grounding terminal, and wherein the PLC circuit is configured to:
    obtain, through demodulation, a control signal from a first power line carrier signal transmitted on the cable; and
    send the control signal to the controller,
  wherein the controller is configured to control the light control circuit based on the control signal, and
  wherein the light control circuit is and configured to maintain, under control of the controller, a coupling between the first power supply terminal and the second power supply terminal.

3. The monitor of claim 2, wherein the light control circuit is further configured to indicate a light fixture status, and wherein the controller is further configured to:
  generate a report signal based on the light fixture status read from the light control circuit; and
  send the report signal to the PLC circuit, and
  wherein the PLC circuit is further configured to:
    modulate the report signal onto a second power line carrier signal; and
    transmit a modulated second power line carrier signal to the cable.

4. The monitor of claim 1, further comprising a first capacitor circuit, wherein one end of the first capacitor circuit is coupled to the second wiring terminal, and wherein the other end of the first capacitor circuit is coupled to the third wiring terminal and the fourth wiring terminal.

5. The monitor of claim 4, wherein the first capacitor circuit comprises a first capacitor.

6. The monitor of claim 4, wherein the first capacitor circuit comprises a first capacitor and a first fuse, wherein one end of the first capacitor is coupled to one end of the first fuse, wherein the other end of the first capacitor is coupled to the second wiring terminal, and wherein other end of the first fuse is coupled to the third wiring terminal and the fourth wiring terminal.

7. The monitor of claim 4, wherein the first capacitor circuit comprises a first capacitor and a first fuse, wherein one end of the first capacitor is coupled to one end of the first fuse, wherein the other end of the first capacitor is coupled to the fourth wiring terminal, and wherein the other end of the first fuse is coupled to the third wiring terminal and the second wiring terminal.

8. The monitor of claim 1, further comprising:
  a light control circuit coupled to the first power supply terminal and the second power supply terminal;
  a controller coupled to the light control circuit; and
  a power Line communication (PLC) circuit, wherein the PLC circuit comprises a digital communication port and a carrier communication port, wherein the digital communication port is coupled to the controller, wherein the carrier communication port is coupled to the first wiring terminal and the grounding terminal, and wherein the PLC circuit is configured to:
    obtain, through demodulation, a control signal from a first power lire carrier signal transmitted on the cable; and
    send the control signal to the controller, wherein the controller is configured to control the light control circuit based on the control signal, and wherein the light control circuit is configured to break, under control of the controller, a coupling between the first power supply terminal and the second power supply terminal.

9. The monitor of claim 8, wherein the light control circuit is further configured to indicate a light fixture status, and wherein the controller is further configured to:

generate a report signal based on the light fixture status read from the light control circuit; and send the report signal to the PLC circuit, and wherein the PLC circuit is further configured to:

modulate the report signal onto a second power line carrier signal; and transmit a modulated second power line carrier signal to the cable.

10. A light control system, comprising:

a master monitor; and a slave monitor coupled to the master monitor and comprising;

a first wiring terminal group comprising a first wiring terminal and a second wiring terminal, wherein the first wiring terminal is configured to couple to a conducting wire of a cable, and wherein the second wiring terminal is configured to couple to a first primary wiring terminal of an isolation transformer;

a second wiring terminal group coupled to the first wiring terminal group and comprising a third wiring terminal and a fourth wiring terminal, wherein the third wiring terminal is configured to couple to the conducting wire of the cable, and wherein the fourth wiring terminal is configured to couple to a second primary wiring terminal of the isolation transformer;

a grounding terminal configured to couple to a grounding medium of the cable;

a first power supply terminal configured to couple to a secondary output terminal of the isolation transformer; and a second power supply terminal configured to couple to a light fixture, wherein the master monitor is coupled to the conducting wire and the grounding medium of the cable proximate to an output port of a constant current regulator and configured to:

generate a first power line carrier signal; and send the first power line carrier signal to the slave monitor using the cable, and wherein the slave monitor is configured to:

directly receive the first power line carrier signal from the cable; and control the light fixture based on the first power line carrier signal.

11. The light control system of claim 10, further comprising a second capacitor circuit, wherein two ends of the second capacitor circuit are configured to couple to two ends of the conducting wire of the cable proximate to the output port of the constant current regulator.

12. The light control system of claim 11, wherein the second capacitor circuit comprises a second capacitor.

13. The light control system of claim 11, wherein the second capacitor circuit comprises a second capacitor and a second fuse, and wherein one end of the second capacitor is coupled to one end of the second fuse.

14. The light control system of claim 10, wherein the slave monitor further comprises a first capacitor circuit, wherein one end of the first capacitor circuit is coupled to the second wiring terminal, and wherein the other end of the first capacitor circuit is coupled to the third wiring terminal and the fourth wiring terminal.

15. The light control system of claim 14, wherein the first capacitor circuit comprises a first capacitor.

16. The light control system of claim 14, wherein the first capacitor circuit comprises a first capacitor and a first fuse, wherein one end of the first capacitor is coupled to one end of the first fuse, wherein the other end of the first capacitor is coupled to the second wiring terminal, and wherein the other end of the first fuse is coupled to the third wiring terminal and the fourth wiring terminal.

17. The light control system of claim 14, wherein the first capacitor circuit comprises a first capacitor and a first fuse, wherein one end of the first capacitor is coupled to one end of the first fuse, wherein the other end of the first capacitor is coupled to the fourth wiring terminal, and wherein the other end of the first fuse is coupled to the third wiring terminal and the second wiring terminal.

18. A light fixture control method, comprising:

receiving, by a slave monitor, a first power line carrier signal from a master monitor using a cable, wherein the slave monitor is directly coupled to the cable;

obtaining, by the slave monitor, a control signal from the first power line carrier signal through demodulation; and controlling, by the slave monitor, on/off of a light fixture based on the control signal, wherein the light fixture is coupled to the slave monitor.

19. The method of claim 18, wherein the slave monitor comprises a first wiring terminal group, a second wiring terminal group, a grounding terminal, a first power supply terminal, and a second power supply terminal, wherein the first wiring terminal group comprises a first wiring terminal and a second wiring terminal, wherein the first wiring terminal is coupled to a conducting wire of the cable, wherein the second wiring terminal is coupled to a first primary wiring terminal of an isolation transformer, wherein the second wiring terminal group comprises a third wiring terminal and a fourth wiring terminal, wherein the third wiring terminal is coupled to the conducting wire of the cable, wherein the fourth wiring terminal is coupled to a second primary wiring terminal of the isolation transformer, wherein the grounding terminal is coupled to a grounding medium of the cable, wherein the first power supply terminal is coupled to a secondary output terminal of the isolation transformer, wherein the second power supply terminal is coupled to the light fixture, and wherein controlling the on/off of the light fixture comprises setting up, by the slave monitor based on the control signal, a coupling between the secondary output terminal of the isolation transformer and the light fixture to control the on/off of the light fixture.

20. The method of claim 18, wherein the slave monitor comprises a first wiring terminal group, a second wiring terminal group, a grounding terminal, a first power supply terminal, and a second power supply terminal, wherein the first wiring terminal group comprises a first wiring terminal and a second wiring terminal, wherein the first wiring terminal is coupled to a conducting wire of the cable, wherein the second wiring terminal is coupled to a first primary wiring terminal of an isolation transformer, wherein the second wiring terminal group comprises a third wiring terminal and a fourth wiring terminal, wherein the third wiring terminal is coupled to the conducting wire of the cable, wherein the fourth wiring terminal is coupled to a second primary wiring terminal of the isolation transformer, wherein the grounding terminal is coupled to a grounding medium of the cable, wherein first power supply terminal is coupled to a secondary output terminal of the isolation transformer, wherein the second power supply terminal is coupled to the light fixture, and wherein controlling the on/off of the light fixture comprises breaking, by the slave monitor based on the control signal, a coupling between the secondary output terminal of the isolation transformer and the light fixture to control the on/off of the light fixture.

\* \* \* \* \*

UNITED STATES PATENT AND TRADEMARK OFFICE
CERTIFICATE OF CORRECTION

PATENT NO. : 10,612,759 B2
APPLICATION NO. : 16/284683
DATED : April 7, 2020
INVENTOR(S) : Junqiao Wan, Jinbo Huang and Wang Pan Page 1 of 1

It is certified that error appears in the above-identified patent and that said Letters Patent is hereby corrected as shown below:

In the Claims

Claim 2, Column 16, Line 4: "controller coupled" should read "a controller coupled"

Claim 8, Column 16, Line 58: "a power Line communication" should read "a power line communication"

Signed and Sealed this
Second Day of June, 2020

Andrei Iancu
*Director of the United States Patent and Trademark Office*